(12) United States Patent
Wittmann

(10) Patent No.: US 12,337,770 B2
(45) Date of Patent: Jun. 24, 2025

(54) VEHICLE TRIM BAR ASSEMBLY FOR A VEHICLE

(71) Applicant: MOTHERSON INNOVATIONS COMPANY LIMITED, London (GB)

(72) Inventor: Peter Wittmann, Michelau (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 532 days.

(21) Appl. No.: 17/698,140

(22) Filed: Mar. 18, 2022

(65) Prior Publication Data

US 2022/0314901 A1     Oct. 6, 2022

(30) Foreign Application Priority Data

Mar. 30, 2021   (DE) .......................... 102021203240.0

(51) Int. Cl.
*B60R 13/04* (2006.01)
*B60R 9/058* (2006.01)
*B60R 13/02* (2006.01)

(52) U.S. Cl.
CPC .............. *B60R 13/02* (2013.01); *B60R 9/058* (2013.01); *B60R 13/0206* (2013.01); *B60R 13/04* (2013.01)

(58) Field of Classification Search
CPC ..... B60R 9/058; B60R 13/02; B60R 13/0206; B60R 13/04; B60R 9/04; B65D 43/163; B65D 43/165; B65D 43/164; B65D 43/18; B65D 43/20
USPC ........................................................ 296/1.08
See application file for complete search history.

(56) References Cited

U.S. PATENT DOCUMENTS

| 6,568,748 B2 * | 5/2003 | Yoon .......................... B60R 9/04 296/210 |
| 6,974,181 B2 * | 12/2005 | Mikkaichi ............... B60R 13/04 296/213 |
| 10,059,275 B2 * | 8/2018 | Oki ....................... B65D 43/164 |
| 11,981,270 B2 * | 5/2024 | Wittmann ............... B60R 13/07 |
| 2003/0038510 A1 | 2/2003 | Yoon |
| 2022/0314901 A1 * | 10/2022 | Wittmann ............... B60R 13/04 |

FOREIGN PATENT DOCUMENTS

| JP | H0657749 U | * | 8/1994 |
| JP | H0672753 U | | 10/1994 |
| JP | H0674521 U | | 10/1994 |

(Continued)

OTHER PUBLICATIONS

JP-2002200943-A computer translation (Year: 2002).*

(Continued)

*Primary Examiner* — Gregory A Blankenship
(74) *Attorney, Agent, or Firm* — Westman, Champlin & Koehler, P.A.

(57) ABSTRACT

A vehicle trim bar assembly for a vehicle, comprising: a molding element, wherein the molding element comprises an inner boundary that defines an aperture; a frame releasable coupled to the molding element, the frame comprising at least one retaining member, wherein the at least one retaining member couples to the molding element within the inner boundary of the aperture such to retain the frame in an inserted condition to the molding element; and a cover coupled to the frame and configured and arranged such to cover the aperture and to provide access to the aperture upon demand.

20 Claims, 11 Drawing Sheets

(56) References Cited

FOREIGN PATENT DOCUMENTS

JP        H06344833 A     12/1994
JP        2002200943 A * 7/2002

OTHER PUBLICATIONS

JPH0657749U computer translation (Year: 1994).*
Extended European Search Report for European Patent Application No. 22165316.5, dated Sep. 6, 2022, 7 pages.
Office Action for German Patent Application No. 10 2021 203 240.0, dated Jan. 18, 2022, 5 pages.
English translation of Office Action for German Patent Application No. 10 2021 203 240.0, dated Jan. 18, 2022, 4 pages (previously cited on Mar. 18, 2022).

* cited by examiner

VEHICLE TRIM BAR ASSEMBLY FOR A VEHICLE

FIELD

The present disclosure relates to vehicle trim bar assembly for a vehicle.

BACKGROUND

The statements in this section merely provide background information related to the present disclosure and may not constitute prior art.

Modern vehicles include a portion upon an upper surface or roof of a vehicle, to attach a rail to in order to increase the usable space of the vehicle to transport items. Vehicle users typically utilize these rails to aid in transporting items such as, luggage or bicycles as non-limiting examples. Typically, these rails are attached to the vehicle via a connection member, often a bolt, incorporated within the roof of the vehicle. Roof rack covers encase the connection member when the rails are not mounted to the roof of the vehicle. These roof rack covers assist in improving the overall aesthetic of the vehicle, limit ingress of containments such as water and inhibiting the generation of rust around the connection member.

Current roof-rack designs incorporate an arm extruded from the body of the roof-rack cover frame. This arm is intended to provide a means for locating and securing the roof-rack cover to the vehicle in an x-direction. This arm presents a variety of manufacturing and assembly issues. As the roof-rack cover is assembled, the tolerance stack up within the roof-rack cover can result in misalignment when the roof-rack cover is assembled onto the roof-molding of a vehicle. This misalignment results in issues with the functionality of the roof-rack cover. In certain misalignment situations the cover is prevented from opening due to obstruction caused by an interaction with other vehicle components. As a result, this induces an increase in manufacturing cost. The roof-rack cover and other vehicle components often need to be discarded, replaced, or remodeled in order to accommodate the fit onto the roof-molding of a vehicle. Additionally, the arm increases the complexity of the component and induces an increased cost in the injection molding and assembly process.

SUMMARY

Against this background, there is the need to provide roof-rack cover securing feature that overcomes at least some of the stated problems above. According to the invention a vehicle trim bar assembly having the features of claim 1 is provided. Accordingly, it is provided:

A vehicle trim bar assembly for a vehicle, comprising: a trim bar profile, wherein the trim bar profile comprises an inner boundary that defines an aperture; a frame releasably coupled to the trim bar profile, the frame comprising at least one retaining member, wherein the at least one retaining member couples to the trim bar profile within the inner boundary of the aperture such to retain the frame in an inserted condition to the trim bar profile; and a cover coupled to the frame and configured and arranged such to cover the aperture and to provide access to the aperture upon demand.

Vehicle trim bar assembly are comparably narrow components, usually long in comparison to their width and height, made mostly of plastic and/or metal, which frequently have a primarily decorative function. Sometimes these vehicle trim bar assembly have a recess within the trim bar profile, usually rectangular, which can be closed by a flap or sliding mechanism. Due to the low rigidity of the trim bar profile, but also due to the very distinct sizes of these parts and due to material tolerances, it can happen that the flap or sliding mechanism can no longer be opened or closed when installed. The present invention is based on the knowledge that this potential malfunction is basically due to the direct coupling of the trim bar profile and flap or sliding mechanism. In the worst case, the flap or sliding mechanism may break if a user tries to close it forcibly.

The present invention is therefore based on the concept of decoupling the trim bar profile and flap or sliding mechanism from each other by providing a separate frame which is insertable within the recess of the trim bar profile. Here, the flap or sliding mechanism which forms a cover for covering an aperture defined by the recess is connected with or coupled with the frame so that the flap or sliding mechanism is no longer directly connected with or attached at the trim bar profile. By decoupling the flap or sliding mechanism of the cover part from the trim bar profile, jamming of these parts in case of opening or closing the cover, especially after a longer period of time and/or changing environmental conditions, is prevented or avoided as far as possible.

In addition, specially provided punch-outs on the trim bar profile are no longer required, which further simplifies the manufacturing process. Instead, it is sufficient to provide only a reference punching for defining an orientation. In the case of a vehicle trim part assembly, this saves at least four hydraulic tools or punching units for cutting out the contours. This way, a significant reduction in cycle times and manufacturing costs may be achieved.

The present invention also allows an easy, a self-fitting assembly of the vehicle trim bar assembly such that a standard vehicle trim bar assembly may be used for a large number of vehicle body shell structures and channel geometries, i.e. dimensions. Therefore, simplifying assembly in general and leaving less room for possible assembly faults is a further benefit.

Advantageous configurations and developments emerge from the further dependent claims and from the description with reference to the figures of the drawings.

In a preferred embodiment, the at least one retaining member comprises at least one first retaining member wherein the at least one first retaining member is arranged and configured such to retain the frame to the trim bar profile inside the aperture at least crosswise or traverse to the longitudinal alignment of the trim bar assembly. The longitudinal alignment, which is also referred to as the X-direction, specifies the longitudinal alignment of the trim bar assembly. In the case of a roof trim assembly, for example, this longitudinal alignment is defined by the length of the vehicle. The crosswise or traverse direction is often referred to as Y direction.

Preferably, in an inserted condition the first retaining member is located along a first boundary side of the aperture. Typically, the first boundary side is defined by the elongated side or edge of the aperture.

In a further preferred configuration, the at least one retaining member comprises at least one second retaining member wherein the at least one second retaining member is arranged and configured such to retain the frame to the trim bar profile inside the aperture at least along to the longitudinal alignment of the trim bar assembly.

Preferably, in an inserted condition the second retaining member is located along a second boundary side and/or a third boundary side of the aperture. In a further preferred embodiment, the second boundary side and the third boundary side are arranged opposite to each other with respect to the aperture, preferably at front edges or walls of the aperture.

According to a particular preferred configuration, the second boundary side and/or the third boundary side are arranged adjacent to the first boundary side with respect to the aperture. This way, it is possible to insert the frame inside the aperture of the trim bar profile such that it is fixed in either direction, which is as well in the X-direction and also in the y-direction. This makes it possible to safely position and align the frame within the aperture of the trim bar profile in a predefined way which makes the complete mounting steps easier.

In a preferred embodiment, the at least one retaining member is integrally molded within the frame. The vehicle trim bar assembly of any one of the preceding claims, wherein a profile of the vehicle trim bar assembly is manufactured as an extrusion part and/or an extruded part.

According to another embodiment, a profile of the vehicle trim bar assembly may be manufactured as an extrusion part. According to another embodiment, the profile of the vehicle trim bar assembly may be manufactured as an extruded part. Alternatively or additionally, other manufacturing processes such as injection molding or the like may be applied. In exemplary embodiments, the profile of the vehicle trim bar assembly may be manufactured from a metal material, a metal alloy or a metallic material combination. For example, the profile of the vehicle trim bar assembly may be manufactured entirely from aluminum, in particular. Likewise, the profile of the vehicle trim bar assembly, in particular when completed, may be manufactured from a plastic material. In a preferred embodiment, the support web may also be extruded onto the extruded trim bar profile, or, combinedly, be manufactured in a single process step by means of a multi-component extrusion process. For example, the trim bar profile and/or the support web may be manufactured from a thermoplastic, e.g. PVC, or another suitable plastic material. For example, the trim bar profile may be manufactured by mono extrusion. The support web may be subsequently connected to it or extruded, for example. The trim bar profile may also be manufactured together with the support web by means of co-extrusion. In alternative embodiments, however, the trim bar profile may also be manufactured from a composite material such as a fiber-reinforced plastic or the like, for example a carbon-fiber-reinforced plastic.

According to a further embodiment, a profile of the trim bar profile of the vehicle trim bar assembly may be C-shaped. Each of the legs of the "C" shape may be adapted as a fixing leg, while the corresponding other leg functions as a support leg. A nearly C-shaped design of the trim bar profile is particularly simple to install. For this purpose, the vehicle trim bar may, for example, be slid in and/or inserted into the channel and fixed to the vehicle structure using the fixing leg, e.g. by means of fixing openings and/or mounting brackets, or the like, provided for this purpose. If the length of the support web has previously been adapted to the depth of the channel, e.g. by cutting to length, the vehicle trim bar is automatically sitting on the channel bottom, and covers the channel in an accurately fitting manner with the vehicle structure.

According to another embodiment, a profile of the trim bar profile of the vehicle trim bar assembly may be adapted with a trim bar core and a trim bar coating. The trim bar core may be, at least partially, embedded in the trim bar coating.

In particular, the trim bar core may be completely embedded in the trim bar coating. In alternative embodiments, however, the trim bar core may also only be partially coated. For example, a trim bar profile which is open on one side may be provided, in which the trim bar core on one side of the trim bar profile remains open towards the outside. In a preferred exemplary embodiment, the trim bar profile may have an open trim bar core on a visible area facing away from the vehicle. In another preferred exemplary embodiment, the trim bar profile may have an open trim bar core on an inner surface facing the vehicle opposite from the visible area. The trim bar coating may function as the structural core of the trim bar profile providing stability and strength. The trim bar coating, on the other hand, may be manufactured from a material that is as light as possible and yet resistant to wear and tear. In addition, the trim bar coating itself may be coated with a varnish, paint, protective layer, etc. to ensure temperature resistance, fluid repellency, and durability. In alternative embodiments, however, the trim bar profile may also consist entirely or substantially entirely of one material, e.g. a metal material, e.g. aluminum or a plastic material.

According to another embodiment, the vehicle trim bar assembly is adapted as a roof trim bar configured for covering a roof channel of the structure or body of the vehicle.

In one preferred embodiment, the cover is pivotably coupled to the frame. In particular, the cover is pivotably coupled to the retaining members. Alternatively, the opening of the cover may also be executed by means of a sliding mechanism, a clip mechanism or the like.

In a preferred configuration the frame comprises a first guiding mechanism which is configured for defining and guiding an opening process and/or closing process, such as rotary movement, clapping movement, sliding movement or the like.

According to a particular preferred configuration, at least one of the retaining members of the frame comprises a first sloped surface facing towards the aperture. The first sloped surface is preferably part of the first guiding mechanism and is arranged and configured such to enable an edge surface of the cover to move along the first sloped surface during an opening and/or closing process. As such, besides their function of retaining the frame within the aperture of the trim bar profile, the retaining members are assigned with an additional functionality of enabling a predefined opening and closing of the cover.

According to a preferred embodiment, the frame comprises a second guiding mechanism which is configured for guiding during an inserting process for inserting the frame inside an aperture of the trim bar profile. This enables an easy, self-adjusting insertion of the trim bar profile and avoids the chance of jamming the cover.

According to a preferred configuration, the at least one of the retaining members of the frame comprises a second sloped surface facing the far side of the aperture. The second sloped surface is part of the second guiding mechanism and is arranged and configured such to enable an edge surface of the trim bar profile to move along the sloped surface during an inserting process. As such, besides their function of retaining the frame within the aperture of the trim bar profile and/or defining an opening/closing process, the retaining members are assigned with still an additional functionality of enabling an inserting the frame inside the aperture of the trim bar profile.

According to a particular preferred configuration, the at least one of the retaining members comprises a conical shaped portion that comprises as well the first and second guiding mechanism. Their first and second sloped surfaces are arranged on opposite sides of the conical shaped portion. Employing only one part which presents two different functionalities, i.e. guiding a defined inserting and additionally guiding an opening process of the cover, is efficient and cost reducing.

Preferably, at least one of the first or second guiding mechanism is rounded in their upper portion. The upper portion is that part of the guiding mechanism or retaining element which is facing to the upper surface of the trim bar assembly. This way, the inserting process and/or the opening and closing process are smoother and easier.

It should be noted that the features set out individually in the following description can be combined with each other in any technically advantageous manner and set out other forms of the present disclosure. The description further characterizes and specifies the present disclosure in particular in connection with the Figures.

DRAWINGS

In order that the disclosure may be well understood, there will now be described various forms thereof, given by way of example, reference being made to the accompanying drawings, in which.

DETAILED DESCRIPTION

Figure 1:
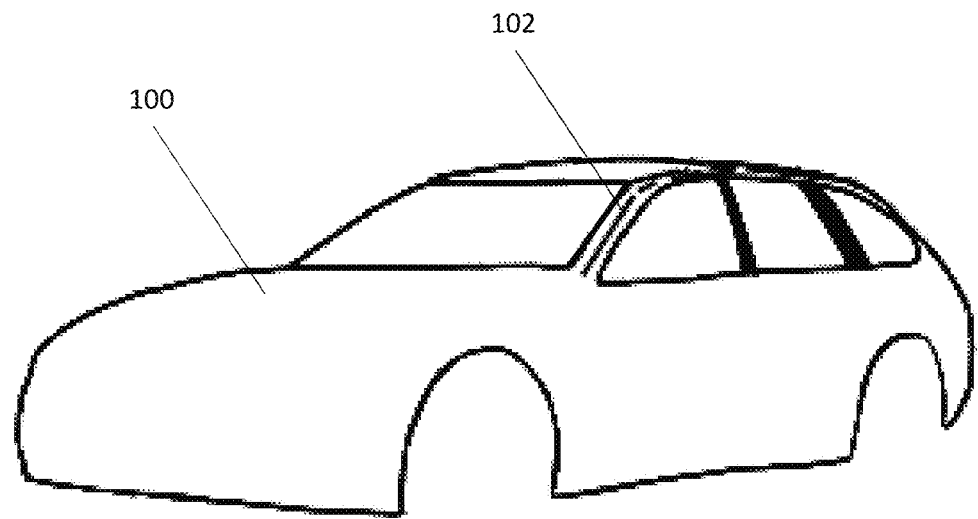
FIG. 1 depicts an isometric view of a vehicle with a trim bar profile.

The following description is merely exemplary in nature and is not intended to limit the present disclosure, application, or uses. It should be understood that throughout the drawings, corresponding reference numerals indicate like or corresponding parts and features.

Figure 2:
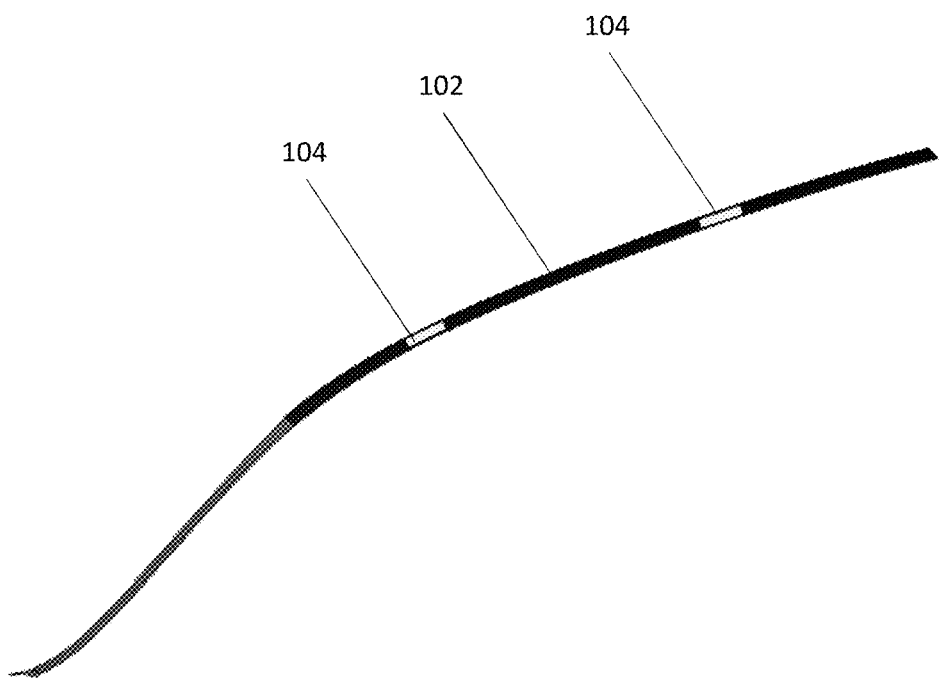
FIG. 2 depicts the trim bar profile with a cover assembly.

FIG. 1 depicts an isometric view of a vehicle 100 with a trim bar profile 102. In this variation the trim bar profile 102 defines the area wherein a roof-rack, not shown, is designed to be attached. In other variations the trim bar profile 102 may be on other areas of the vehicle 100 such as the hood, fender, door, bumper, or any other vehicle component. The trim bar profile 102 is further depicted in FIG. 2. As shown in FIG. 2 the trim bar profile 102 comprises at least one cover assembly 104. In this form there are four cover assemblies 104, two on opposite sides of the vehicle 100. Other variations may contain more or less cover assemblies 104 to align with design constraints. In this form, the cover assembly 104 assists in protecting the connection component for the attachment of a roof-rail (not shown) to the vehicle 100.

Figure 3:
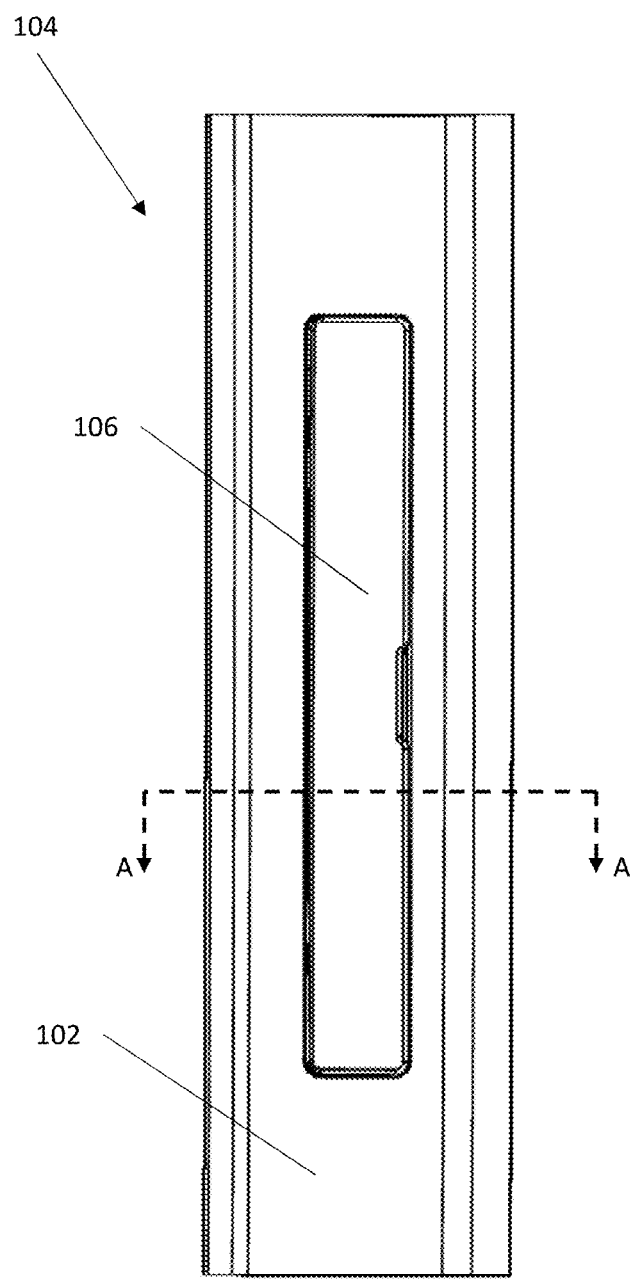
FIG. 3 depicts a top view of the cover assembly.
Figure 4:
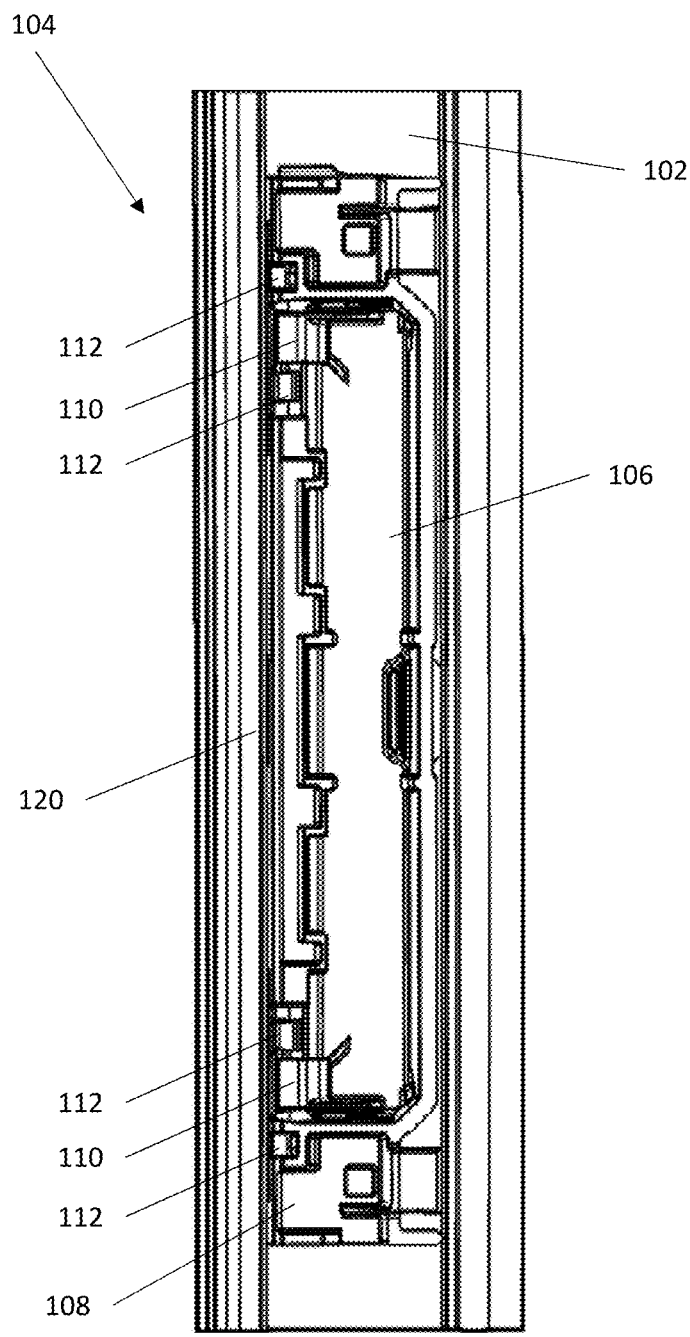
FIG. 4 depicts a bottom view of the cover assembly.

FIG. 3 depicts a top view of the cover assembly 104. As seen and previously mentioned, the cover assembly 104 cooperates with the molding component 102 to protect the connection component of the vehicle 100, not shown. The cover assembly 104 comprises a cover 106. The cover 106 is pivotably coupled to a frame 108, as seen in FIG. 4. The molding component 102 is located between the cover 106 and the frame 108. Section A-A s shown in FIG. 3 and will be discussed in more details in FIG. 8. FIG. 4 depicts a bottom view of the cover assembly 104. The cover 106 comprises at least one cover pivot connection 110 that cooperates with at least one frame receiving element 112 located along a first boundary side 120. In this form, the cover 106, comprises two cover pivot connections 110. For each cover pivot connection 110 there are two frame receiving elements 112. In other variations there may be more or less cover pivot connections 110 and frame receiving elements 112 to align with design constraints.

Figure 5:
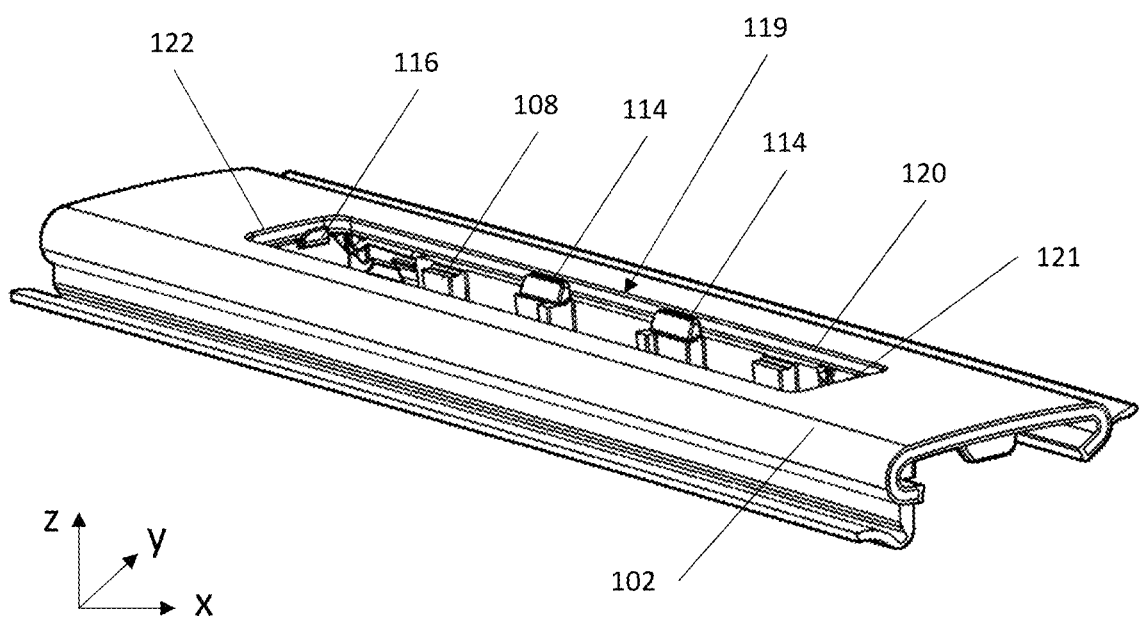
FIG. 5 depicts an isometric view of the cover assembly with the cover removed to show a retention system.
Figure 6:
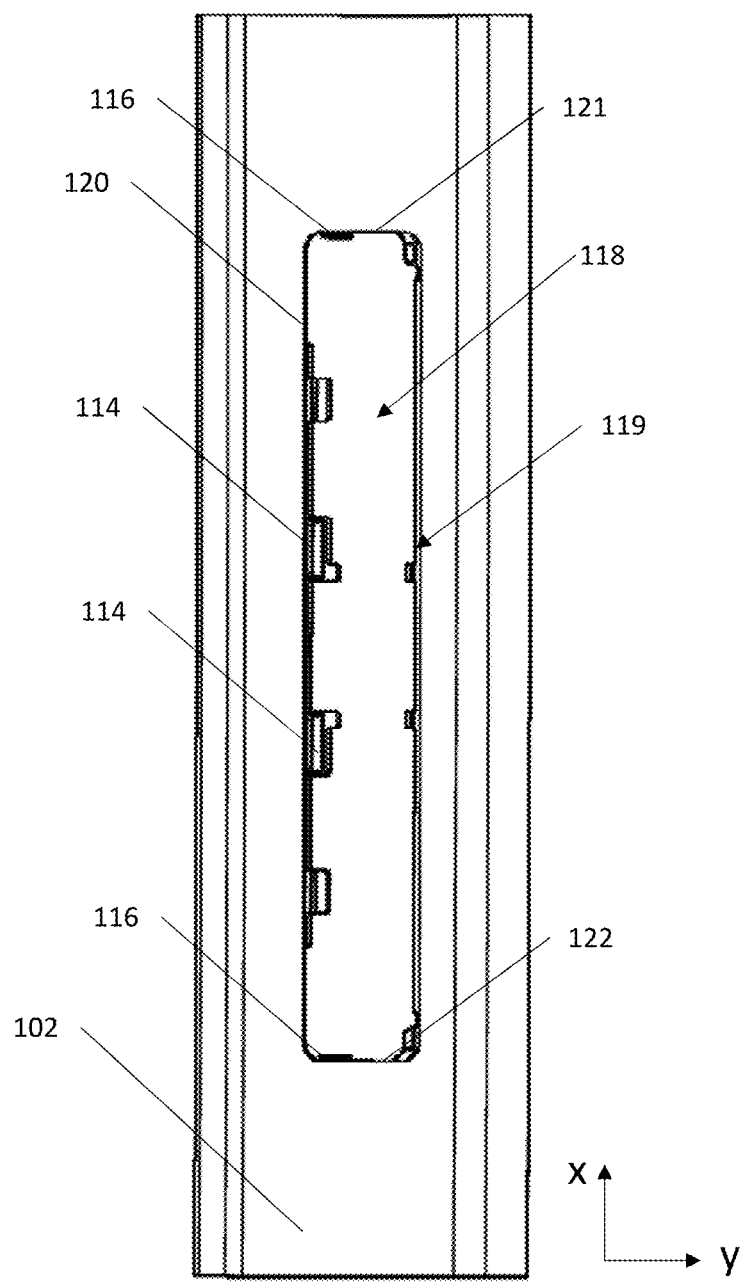
FIG. 6 depicts a top view of the cover assembly with the cover removed to show the retention system.

FIG. 5 and FIG. 6 depict an isometric view and a top view, respectively, of the cover assembly 104 with the cover 106 removed to illustrate the connection between the frame 108 and the molding component 102. The frame 108 comprises at least one first retaining member 114 and/or at least one second retaining member 116. The at least one first retaining member 114 and the at least one second retaining member 116 couple to the trim bar profile 102 along an inner boundary 119 of an aperture 118 within the trim bar profile 102. The at least one of the first retaining member 114 locates and retains the trim bar profile 102 to the frame 108 in a y-direction. The at least one second retaining member 116 locates and retains the molding component 102 to the frame 108 in an x-direction. Both the first retaining member 114 and the second retaining member 116 also act as guides to align the frame 108 within the molding component 102. In this form, the first and second retaining members 114, 116 act as stoppers to retain the molding component 102 to the frame 108 in the y and x direction. In other variations, the first and/or second retaining members 114, 116 may contain a clip or snap feature to secure the trim bar profile 102 to the frame 108. In this form, there are two first retaining members 114 cooperating with the first boundary side 120 of the aperture 118. In another variation, the retaining member 114 may be a single elongated retaining member. There are also two second retaining members 116, in this form. One of the second retaining members 116 are located along a second boundary side 121 of the inner boundary 119 of the aperture 118. Another of the second retaining members 116 are located along a third boundary side 122 of the inner boundary 119 of the aperture 118. The second and third boundary side 121, 122 are adjacent to the first boundary side 120. In other forms, there may be more or less first retaining members 114 and/or second retaining members 116 in varying dimensions to align with design constraints.

Figure 7:
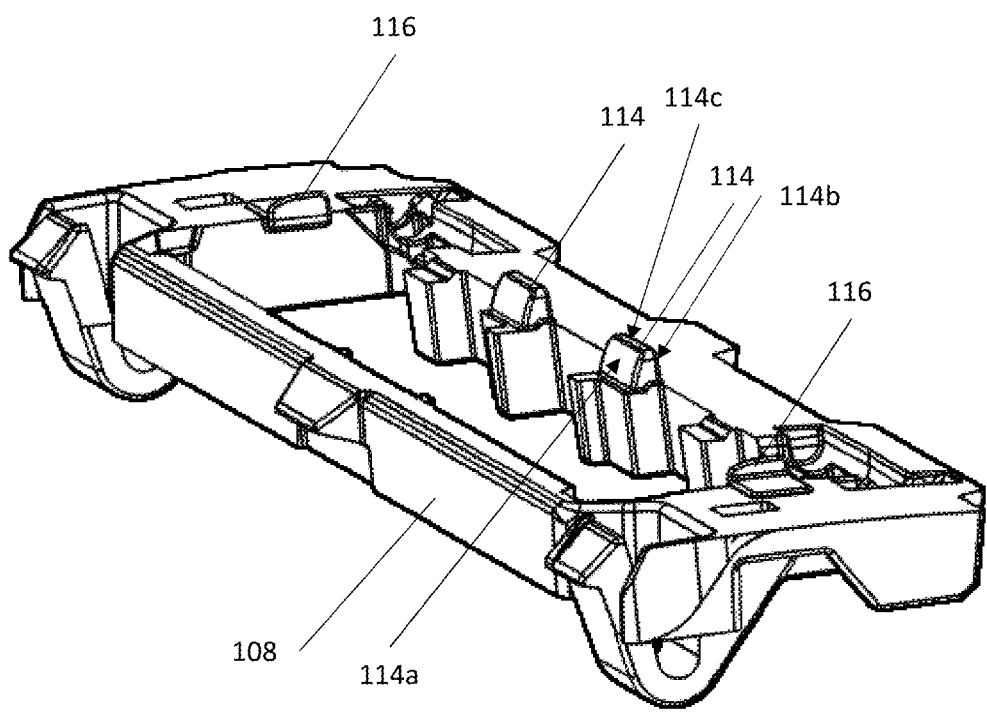
FIG. 7 depicts an isometric view of the frame of the cover assembly.

FIG. 7 depicts an isometric view of the frame 108. FIG. 7 shows the location of the first retaining members 114 and the second retaining members 116 within the frame 108. In this form, the first and second retaining members 114, 116 are integrally molded within the frame 108. In other variations the first and second retaining members 114, 116 may be disjointly coupled to the frame 108. In this form, the second retaining member 116 has an L-shaped geometry. This enables the second retaining member 116 to efficiently retain the trim bar profile 102 to the frame 108. In other variations, the second retaining member 116 may take on other geometries to align with design constraints.

Figure 8:
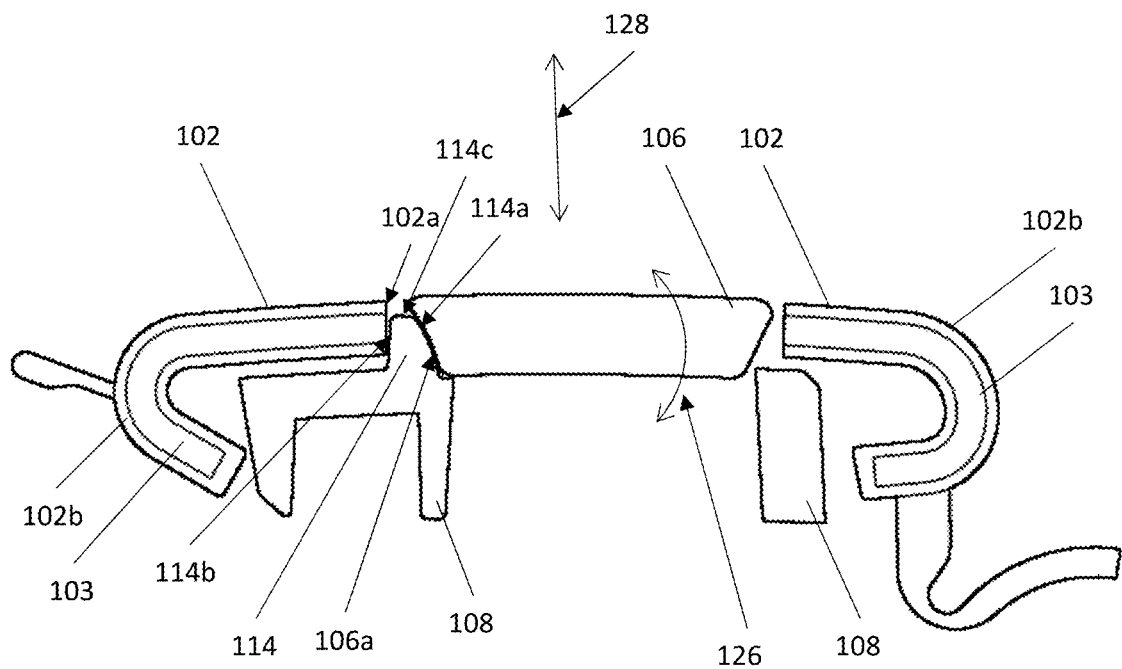
FIG. 8 depicts a section view of the cover assembly.

FIG. 8 depicts a section view A-A, as seen if FIG. 3, of the cover assembly 104. The section view shows the relationship between the trim bar profile 102, cover 106, frame 108, and the first retention member 114. As seen in this form, the first retention member 114 has a trapezoidal shape to coincide with the geometry of the cover 106. The geometry of the first retention member 114 cooperates with the geometry of the cover 106 to ensure efficient rotation of the cover 106 when it is opened and/or closed. In other variations, the first retention member 114 may take on other geometric forms that allows adequate clearance for the cover 106 to pivot while opening or closing. The trim bar profile 102 comprises a profile that includes a trim bar coating 102b. The trim bar coating 102b surrounds a trim bar core 103 which may be partially embedded in the trim bar coating 102c.

Hereinafter, the functionality of the elements of the cover assembly 104 are described with regard to the embodiments shown in FIGS. 7 and 8:

The cover 106 is pivotably coupled to the retaining members 114 of the frame 108, wherein reference symbol 128 denotes the direction of the rotation of the pivotable cover 106. The frame 108 is preferably removable and insertable in to the trim bar profile 102. For this purpose, the frame 108 is inserted in a direction 130 into a recess of the trim bar profile 102, which forms the aperture 118.

The first retaining members 114 of the frame 108 comprises a first sloped surface 114a that functions as a first guiding mechanism 114 and a second sloped surface 114b that functions as second guiding mechanism 114.

The first guiding mechanism 114 is configured for guiding an opening process and/or closing process. For this purpose, the first guiding mechanism 114 comprises a first sloped surface 114a. The first guiding mechanism 114 is configured and arranged such that the first sloped surface 114a is facing towards the aperture 118. The first sloped surface 114a is arranged and configured such to enable an edge surface 106a of the cover 106 to move along the first sloped surface 114a during an opening and/or closing process.

The second guiding mechanism 114 is configured for guiding during an inserting process for inserting the frame 108 inside the aperture 118 of the trim bar profile 102. For this purpose, the second guiding mechanism 114 comprises a second sloped surface 114b. The second guiding mechanism 114 is configured and arranged such that the second sloped surface 114b is facing the far side of the aperture 118. The second sloped surface 114b is arranged and configured such to enable an edge surface 102a of the trim bar profile 102 to move along the second sloped surface 114b during an inserting process. The first and second guiding mechanisms 114 are rounded in their upper portion 114c such that their first and second surfaces 114a, 114b, respectively, have a curved surface in the upper portion. This enables the opening movement of the cover 106 in the direction 128 and the inserting movement of the frame 108 in the direction 130.

In the embodiment shown in FIGS. 7 and 8, the first and second guiding mechanism 114 are part of the same portion of the retaining element 114 which has a conical shape. The first and second sloped surfaces 114a, 114b are arranged on opposite sides of the conical shaped portion of the retaining element 114.

Figure 9:
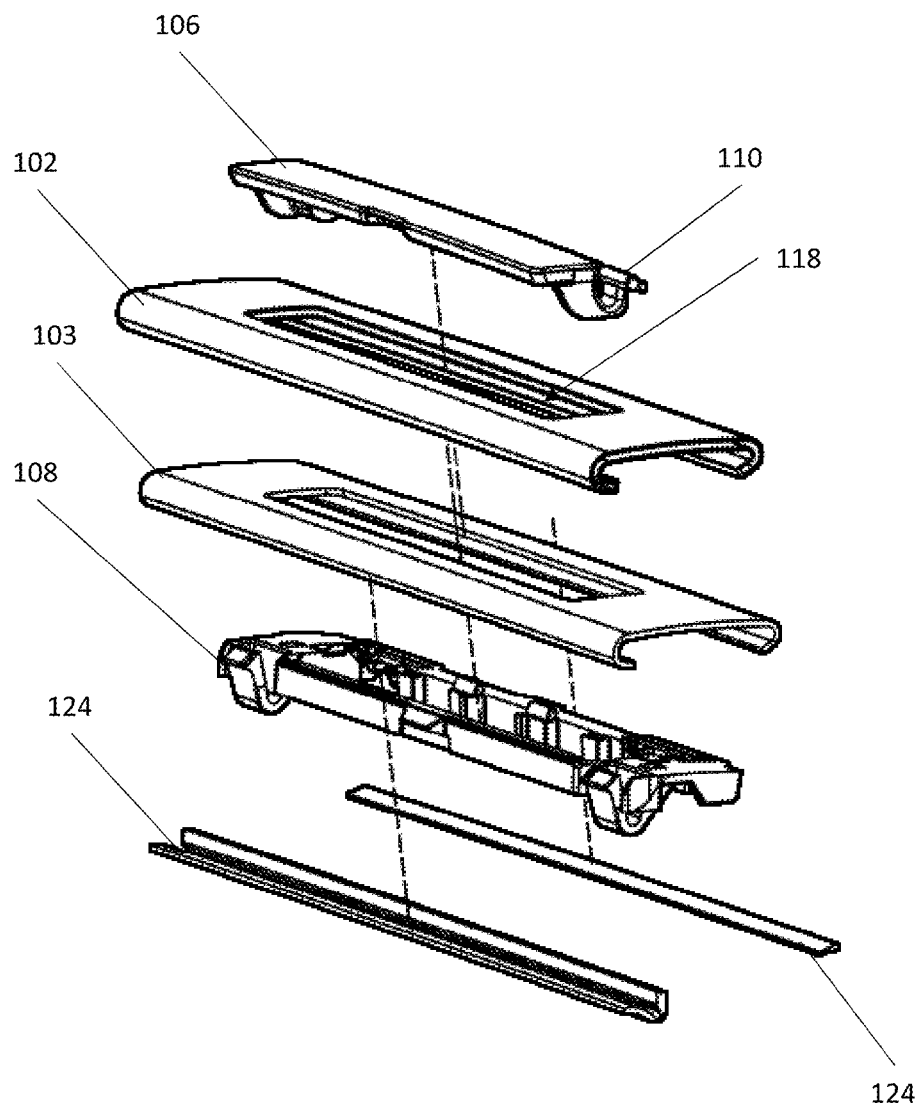
FIG. 9 depicts an exploded view of the cover assembly.

FIG. 9 depicts an exploded view of the cover assembly 104. As seen, the cover 106 covers the aperture 118 in the trim bar profile 102. Through the aperture 118, the cover 106 is pivotably coupled to the frame 108 at the cover pivot connections 110 and the frame receiving elements 112, seen in FIG. 4. The trim bar profile 102 encases the trim bar core 103 which provides additional structural support to the trim bar profile 102. The trim bar core 103 is a hard-material such as steel, aluminum, etc., to reinforce the trim bar profile 102. A tolerance compensator 124 couples to the trim bar profile 102 to cover any gaps between the trim bar profile 102 and the vehicle 100 caused by tolerance misalignments. The tolerance compensator 124 is typically a soft-material substance to conform to gaps between components on the vehicle 100 provide a gap-free impression when the trim bar profile 102 is attached to the vehicle 100. The trim bar profile 102 is coupled to the vehicle 100 via additional clips (not shown).

Figure 10:
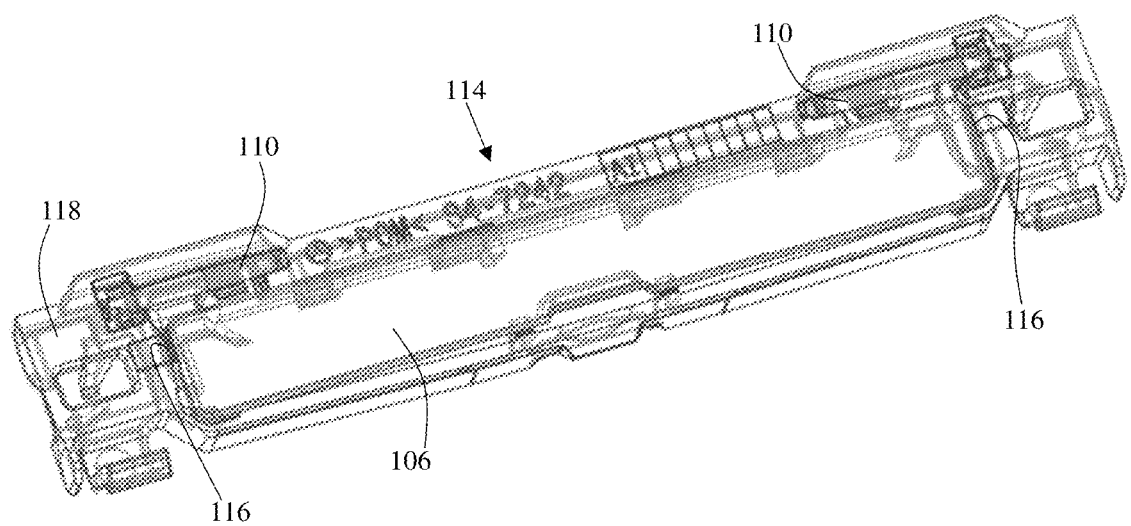
FIG. 10 depicts an isometric view of a further cover assembly comprising a cover, wherein the cover is in its closed position.
Figure 11:
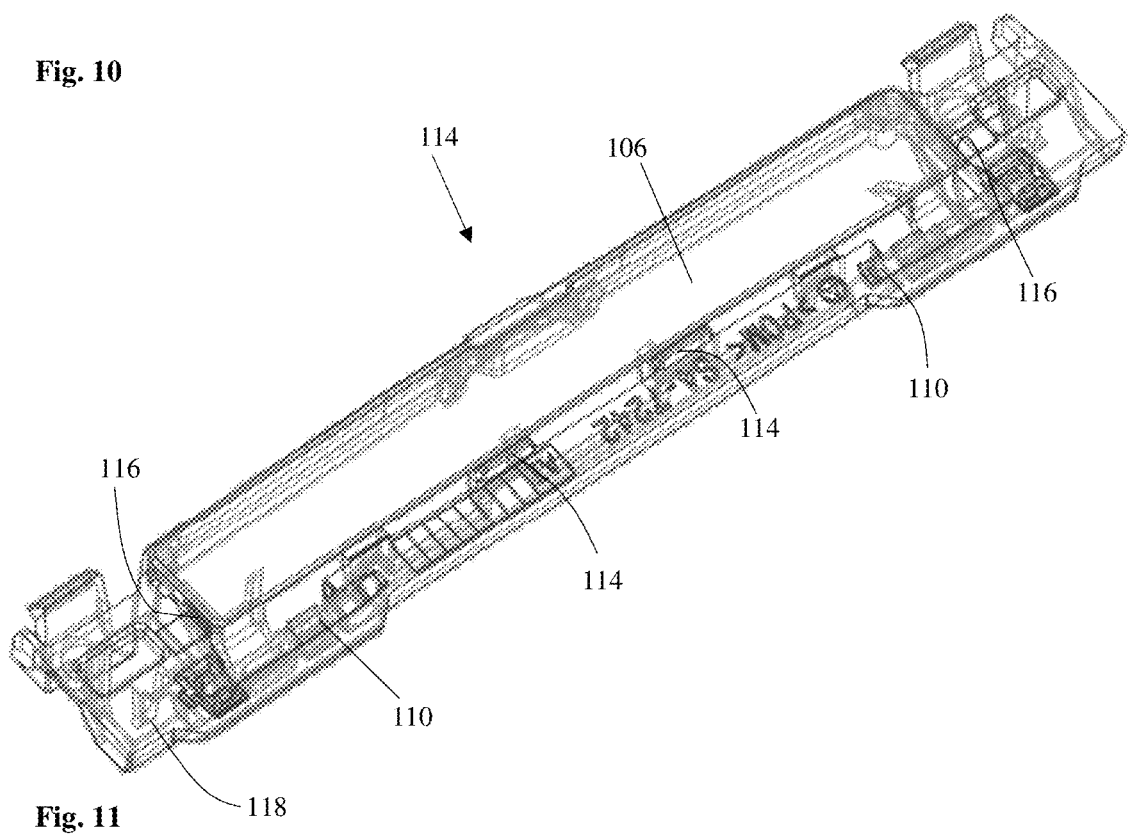
FIG. 11 depicts another isometric view of the cover assembly of FIG. 10.
Figure 12:
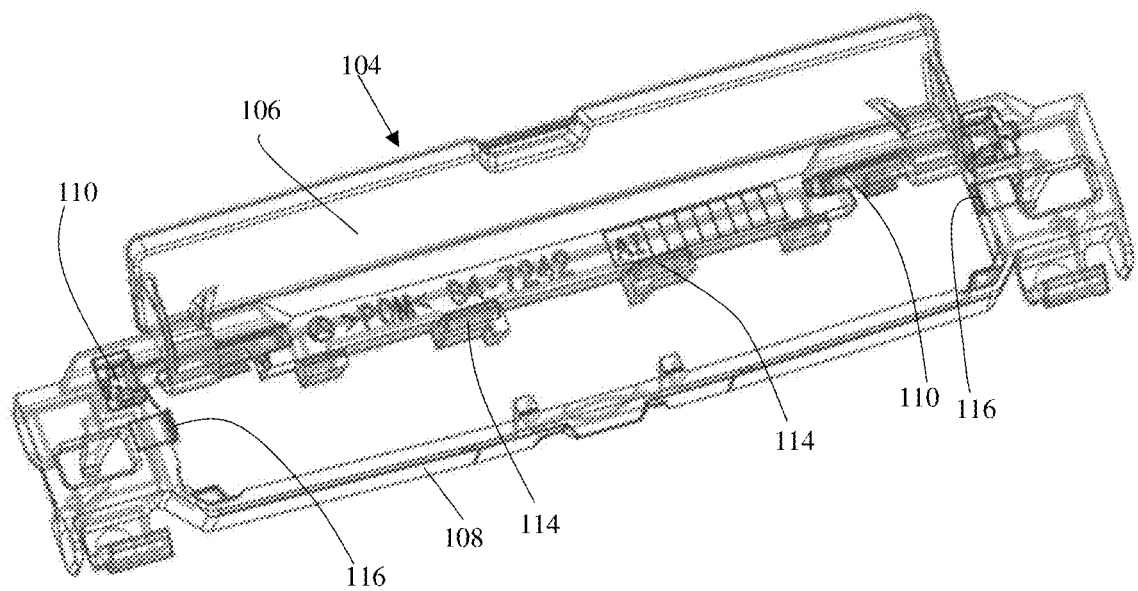
FIG. 12 depicts an isometric view of the cover assembly of FIGS. 10 and 11, wherein the cover is in its open position.
Figure 13:
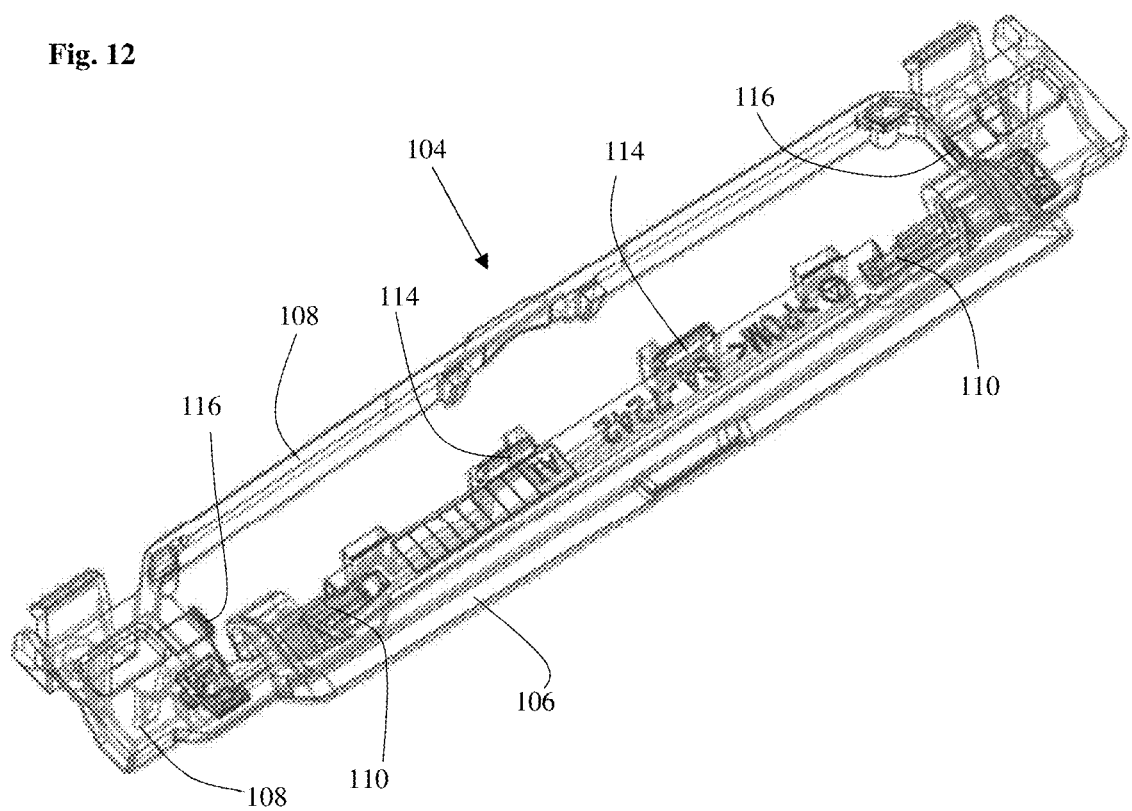
FIG. 13 depicts another isometric view of the cover assembly of FIG. 12.

FIGS. 10 to 13 depict an isometric view of a further cover assembly 104. As seen and previously mentioned, the cover assembly 104 cooperates with a trim bar profile 102 of a vehicle 100, wherein the trim bar profile 102 comprises an inner boundary that defines an aperture 108 as depicted before in FIGS. 1-9. The frame 108 is releasably coupled to the trim bar profile. The cover assembly 104 comprises a cover 106 which is coupled to the frame 108 and is configured and arranged such to cover the aperture as depicted in FIGS. 10-11 and to provide access to the aperture upon demand as depicted in FIGS. 12-13. The cover 106 is pivotably coupled to a frame 108, as seen in FIGS. 10-13, wherein in FIGS. 10-11, the cover 106 is in its closed position and in FIGS. 12-13 the cover 106 is in its open position. The cover 106, comprises two cover pivot connections 110. For each cover pivot connection 110 there are two frame receiving elements 112.

FIGS. 11, 12 and 13 show the location of first retaining members 114 and second retaining members 116 within the frame 108. The first retaining member 114 is arranged and configured such to retain the frame 108 to the trim bar profile inside the aperture of the trim bar profile at least crosswise or traverse to the longitudinal alignment of the trim bar assembly. The longitudinal alignment, which is also referred to as the X-direction, specifies the longitudinal alignment of the trim bar assembly. In the case of a roof trim assembly, for example, this longitudinal alignment is defined by the length of the vehicle. The crosswise or traverse direction is often referred to as Y direction. In an inserted condition, the first retaining member 114 is located along a first boundary side of the aperture. Typically, the first boundary side is defined by the elongated side or edge of the aperture. The second retaining member 116 is arranged and configured such to retain the frame 108 to the trim bar profile inside the aperture at least along to the longitudinal alignment of the trim bar assembly.

In an inserted condition the second retaining member 116 is located along a second boundary side and a third boundary side of the aperture in the example depicted in FIGS. 10-13. The second boundary side and the third boundary side are arranged opposite to each other with respect to the aperture, preferably at front edges or walls of the aperture.

Further, the second boundary side and the third boundary side are arranged adjacent to the first boundary side with respect to the aperture. This way, it is possible to insert the frame 108 inside the aperture of the trim bar profile such that it is fixed in either direction, which is as well in the X-direction and also in the y-direction. This makes it possible to safely position and align the frame within the aperture of the trim bar profile in a predefined way which makes the complete mounting steps easier.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features disclosed in the foregoing description, in the drawings and in the claims can be essential both individually and in any combination for the implementation of the disclosure in its various embodiments.

LIST OF USED REFERENCE SYMBOLS

100—Vehicle
102—Trim Bar Profile
102a—Edge Surface
102b—Trim Bar Coating
103—Trim Bar Core
104—Cover Assembly, Vehicle Trim Bar Assembly
106—Cover, Flap or Sliding Mechanism
106a—Edge Surface
108—Frame
110—Cover Pivot Connection
112—Frame Receiving Member
114—First Retaining Member, First and Second Guiding Mechanism
114a—First Sloped Surface
114b—Second Sloped Surface
114c—Upper Portion
116—Second Retaining Member
118—Aperture, Recess
119—Inner Boundary
120—First Boundary Side
121—Second Boundary Side
122—Third Boundary Side
124—Tolerance Compensator
126—Direction of Rotation
128—Direction of Inserting Movement

What I claim is:

1. A vehicle trim bar assembly for a vehicle, comprising:
a trim bar profile, wherein the trim bar profile comprises an inner boundary that defines an aperture;
a frame releasably coupled to the trim bar profile, the frame comprising at least one retaining member, wherein the at least one retaining member couples to the trim bar profile within the inner boundary of the aperture to retain the frame in an inserted condition to the trim bar profile; and
a cover coupled to the frame and configured and arranged to cover the aperture and to provide access to the aperture upon demand,
wherein the at least one retaining member comprises at least one second retaining member wherein the at least one second retaining member is arranged and configured to retain the frame to the trim bar profile inside the aperture at least along to the longitudinal alignment of the trim bar assembly, and
wherein in an inserted condition the second retaining member is located along a second boundary side or a third boundary side of the aperture, wherein the second boundary side and the third boundary side are arranged opposite to each other with respect to the aperture.

2. The vehicle trim bar assembly of claim 1, wherein the at least one retaining member comprises at least one first retaining member, wherein the at least one first retaining member is arranged and configured to retain the frame to the trim bar profile inside the aperture at least crosswise to the longitudinal alignment of the trim bar assembly.

3. The vehicle trim bar assembly of claim 2, wherein in an inserted condition the first retaining member is located along a first boundary side of the aperture.

4. The vehicle trim bar assembly of claim 1, wherein the second boundary side and the third boundary side, respectively, are arranged adjacent to the first boundary side with respect to the aperture.

5. The vehicle trim bar assembly of claim 1, wherein the at least one retaining member is integrally molded within the frame.

6. The vehicle trim bar assembly of claim 1, wherein a profile of the vehicle trim bar assembly is manufactured as an extrusion part or an extruded part.

7. The vehicle trim bar assembly of claim 1, wherein a profile of the trim bar profile of the vehicle trim bar assembly is substantially C-shaped.

8. The vehicle trim bar assembly of claim 1, wherein a profile of the trim bar profile of the vehicle trim bar assembly includes a trim bar core and a trim bar coating, the trim bar core being at least partially embedded in the trim bar coating.

9. The vehicle trim bar assembly of claim 1, wherein the vehicle trim bar assembly is adapted as a roof trim bar configured for covering a roof channel of the structure or body of the vehicle.

10. The vehicle trim bar assembly of claim 1, wherein the cover is pivotably coupled to the frame.

11. The vehicle trim bar assembly of claim 10, wherein the cover is pivotably coupled to at least one of the retaining members.

12. The vehicle trim bar assembly of claim 1, wherein the frame comprising a first guiding mechanism which is configured for guiding an opening process of the cover.

13. The vehicle trim bar assembly of claim 12, wherein at least one of the retaining members of the frame comprises a first sloped surface facing towards the aperture wherein the first sloped surface is part of the first guiding mechanism and is arranged and configured such to enable an edge surface of the cover to move along the first sloped surface during an opening process of the cover.

14. The vehicle trim bar assembly of claim 1, wherein the frame comprising a first guiding mechanism which is configured for guiding a closing process of the cover.

15. The vehicle trim bar assembly of claim 14, wherein at least one of the retaining members of the frame comprises a first sloped surface facing towards the aperture wherein the first sloped surface is part of the first guiding mechanism and is arranged and configured such to enable an edge surface of the cover to move along the first sloped surface during a closing process of the cover.

16. The vehicle trim bar assembly of claim 1, wherein the frame comprising a second guiding mechanism which is configured to guiding an inserting process for inserting the frame inside the aperture.

17. The vehicle trim bar assembly of claim 16, wherein at least one of the retaining members of the frame comprises a second sloped surface facing athe far side of the aperture wherein the second sloped surface is part of the second guiding mechanism and is arranged and configured such to enable an edge surface of the trim bar profile to move along the second sloped surface during an inserting process of the frame.

18. The vehicle trim bar assembly of claim 1, wherein at least one of the retaining members comprises a conical shaped portion that comprises as well first and second guiding mechanism wherein their first and second sloped surfaces are arranged on opposite sides of the conical shaped portion.

19. The vehicle trim bar assembly of claim 18, wherein at least one of the first or second guiding mechanism is rounded in their upper portion.

20. A vehicle trim bar assembly for a vehicle, comprising:
a trim bar profile, wherein the trim bar profile comprises an inner boundary that defines an aperture;
a frame releasably coupled to the trim bar profile, the frame comprising at least one retaining member, wherein the at least one retaining member couples to the trim bar profile within the inner boundary of the aperture to retain the frame in an inserted condition to the trim bar profile; and
a cover coupled to the frame and configured and arranged to cover the aperture and to provide access to the aperture upon demand,
wherein the frame comprising a first and a second guiding mechanism which is configured for guiding an opening process and/or closing process wherein the first guiding mechanism comprises a first sloped surface and the second guiding mechanism comprises a second sloped surface,
wherein at least one of the retaining members comprises a conical shaped portion that comprises as well the first and second guiding mechanism wherein their first and second sloped surfaces are arranged on opposite sides of the conical shaped portion and/or wherein at least one of the first or second guiding mechanism is rounded in their upper portion.

\* \* \* \* \*